(12) United States Patent
Rubinstein et al.

(10) Patent No.: US 6,824,268 B2
(45) Date of Patent: Nov. 30, 2004

(54) METHOD FOR DESIGNING OPTICAL ELEMENTS

(75) Inventors: Jacob Rubinstein, Misgav (IL); Gershon Moshe Wolansky, Jerusalem (IL)

(73) Assignee: Shamir Optical Industry, Upper Galilee (IL)

( * ) Notice: Subject to any disclaimer, the term of this patent is extended or adjusted under 35 U.S.C. 154(b) by 0 days.

(21) Appl. No.: 10/298,288

(22) Filed: Nov. 18, 2002

(65) Prior Publication Data

US 2003/0090623 A1 May 15, 2003

Related U.S. Application Data

(63) Continuation-in-part of application No. 09/584,715, filed on Jun. 1, 2000, now Pat. No. 6,655,803.

(51) Int. Cl.[7] .............................................. G02C 7/02
(52) U.S. Cl. ....................................................... 351/177
(58) Field of Search ................................ 351/168, 169, 351/159, 176, 177

(56) References Cited

U.S. PATENT DOCUMENTS

| 2,878,721 A | 3/1959 | Kanolt ........................ 351/169 |
| 3,687,528 A | 8/1972 | Maitenaz .................... 351/169 |
| 4,613,217 A | 9/1986 | Fuerter et al. ............... 351/176 |

(List continued on next page.)

FOREIGN PATENT DOCUMENTS

WO     WO 01/92948     12/2001

OTHER PUBLICATIONS

J. Loos, Ph. Slusaliek and H.P. Seldel, "Using Wavefront Tracking for the Visualization and Optimization of Progressive Lenses", Computer Graphics Forum, vol. 17, No. 3, 1998, pp. 255–264.

D. Malacara and Z. Malacara, "Testing and centering of lenses by means of a Hartmann test with four holes", Optical Engineering, 1992, vol. 31, No. 7, pp. 1551–1555.

J. Porill, J. P. Lyins and J.P. Frisby, "The Variation of Torsion with Vergence and Elevation", vision Research, vol. 39, pp. 3934–3950 (1999).

J. Kneisly, "Local curvature of wavefronts in an optical system", JOSA 54, 1964, pp. 229–235.

O. N. Stavroudis, "The optics of rays, wavefronts and caustics", Academic Press, 1972, pp. 200–207.

A. Wiener and Y. Yomdin, "From Formal numerical Solutions of Elliptic PDE's to the True Ones", Mathematics of Computation, vol. 69, No. 229, pp. 197–235, American Mathematical Society, 1999.

B. D. Ripley, "Pattern Recognition and Neural Networks", Cambridge University Press, Chapter 5.

R. K. Luneberg, "Mathematical Theory of Optics", University of California Press, 1964, Chapter 19.

*Primary Examiner*—Jordan M. Schwartz
(74) *Attorney, Agent, or Firm*—Eitan, Pearl, Latzer & Cohen Zedek, LLP (57) ABSTRACT

In some embodiments of the present invention, a method for designing one or more surfaces of an ophthalmic lens includes representing the surfaces with parameters, choosing a function in the parameters and optimizing the function. The function may include one or more of the following terms: a term involving the magnification induced by the ophthalmic lens and a predetermined magnification distribution, a term involving the distortion induced by the ophthalmic lens and a predetermined distortion distribution, and a term involving the torsion induced by the ophthalmic lens and a predetermined torsion distribution. The function may also involve a term related to the thickness of the ophthalmic lens. The function may also involve one or more weight distributions. The method may include determining the weight distributions from a database of weight functions using a predetermined rule or an expert system.

15 Claims, 4 Drawing Sheets

U.S. PATENT DOCUMENTS

| | | | |
|---|---|---|---|
| 4,676,610 A | 6/1987 | Barkan et al. | 351/169 |
| 4,838,675 A | 6/1989 | Barkan et al. | 351/169 |
| 4,856,889 A | 8/1989 | Guilino et al. | 351/169 |
| 5,771,089 A | 6/1998 | Barth | 351/169 |
| 5,784,144 A | 7/1998 | Kelch et al. | 351/169 |
| 5,886,766 A | 3/1999 | Kaga et al. | 351/169 |
| 5,992,998 A | 11/1999 | Pfeiffer et al. | 351/169 |
| 6,019,470 A | 2/2000 | Mukaiyama et al. | 351/169 |
| 6,082,856 A | 7/2000 | Dunn et al. | 351/160 H |
| 6,302,540 B1 | 10/2001 | Katzman et al. | 351/161 |
| 6,318,859 B1 | 11/2001 | Baudart et al. | 351/169 |
| 6,366,823 B1 | 4/2002 | Shirayanagi | 700/97 |
| 6,382,789 B1 | 5/2002 | Baudart et al. | 351/177 |

METHOD FOR DESIGNING OPTICAL ELEMENTS

CROSS REFERENCE

This application is a Continuation-in-Part application of U.S. application Ser. No. 09/584,715, filed on Jun. 1, 2000 now U.S. Pat. No. 6,655,803.

BACKGROUND OF THE INVENTION

Many designs for progressive (multifocal) ophthalmic lenses are based mainly on the geometrical shape of one or more of the lens surfaces. The geometrical properties, however, are only indirectly related to the lens' actual optical performance. For example, the curvature of any of the lens surfaces is only approximately related to the lens optical power.

The actual performance of an ophthalmic lens depends not just on the lens itself, but on the full eye-plus-lens system. This becomes particularly important, for example, when the lens user suffers from astigmatism and/or presbyopia. Astigmatism is a condition in which the eye focuses differently in different directions. Presbyopia is a condition in which the eye loses some of its ability to accommodate, i.e. to focus sharply at nearby objects. The curvature of the lens of the eye changes as the eye focuses on objects at different distances from the eye. As people age, their eyes become less elastic and therefore can change the curvature of the lens only to a certain degree.

The article by J. Loos, Ph. Slusallek and H. -P. Seidel, entitled "Using Wavefront Tracing for the Visualization and Optimization of Progressive Lenses", *Computer Graphics Forum*, vol. 17, no. 3, 1998, pp. 255–264, U.S. Pat. No. 6,302,540 to Katzman et al. and U.S. Pat. No. 6,382,789 to Baudart et al. describe methods for designing a lens that are based on optimizing certain classical optical characteristics such as power and astigmatism. PCT publication WO 01/92948 by Rubinstein et al. further provides a method for optimizing a lens where the optimization parameters include a control on the variations of the optical properties across the lens and a control on the astigmatism direction distribution.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods and procedures have not been described in detail so as not to obscure the present invention.

Some embodiments of the present invention are directed to a method for designing optical elements by an optimization process. Although the scope of the present invention is not limited in this respect, the optical element may be an ophthalmic lens. The cost function used in the optimization takes into account classical optical terms such as the power and astigmatism induced by the lens. The cost function also includes terms related to the magnification, distortion and torsion induced by the lens.

Some embodiments of the present invention provide a weighted optimization method where the cost function that is used in the optimization process includes a weighted combination of terms. Some embodiments include methods for selecting or computing the weights in this weighted combination.

Some embodiments of the present invention provide an optimization process that includes a distribution of objects viewed by the wearer of the lens. Some embodiments include methods for optimizing the design for different visual scenes.

In some situations, the surfaces are given explicitly in terms of well-known functions. Examples of such surfaces include spherical surfaces, aspherics, etc. In general, though, the designer should be allowed to design arbitrary surfaces, and therefore, in the present invention, discrete surfaces are used. Discrete surfaces are described in terms of finitely many points, for example, in the form of a set $Q=\{p_i=(x_i,y_i,z_i)\}$, $i=1, \ldots, N$, where N is the total number of points.

There are many ways to describe discrete surfaces. These include spline methods, the finite element method, the unconstrained patches method, the Galerkin method, etc. The present invention is applicable for any method chosen to represent the surface by parameters.

Some embodiments of the present invention are particularly suitable for the design of ophthalmic spectacle lenses, including progressive addition lenses. Therefore, the detailed description that follows describes such an application. However, it will be appreciated by persons skilled in the art that the present invention is equally applicable to many other applications, including but not limited to the design of other optical elements including contact lenses and intraocular lenses and to the design of corneal shaping.

Figure 1:
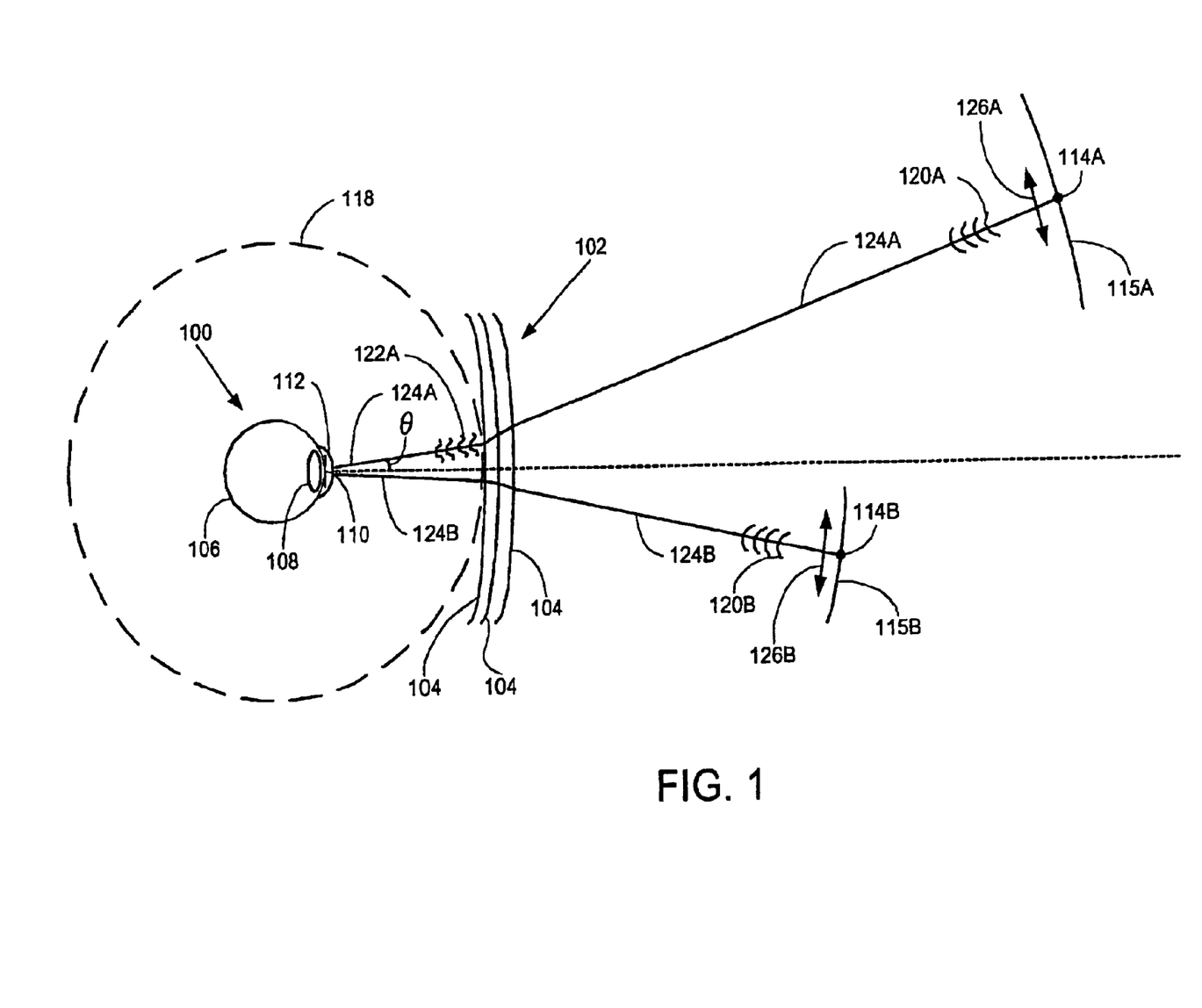
FIG. 1 is a schematic illustration of an eye and a lens having at least two surfaces, according to an embodiment of the present invention.

Reference is now made to FIG. 1, which is a schematic illustration of an eye 100 and a lens 102 having at least two surfaces 104, according to an embodiment of the present invention. Eye 100 comprises a retina 106, an eye-lens 108, a pupil 110 and a cornea 112. At least one of surfaces 104 of lens 102 is unknown and will be optimally designed by the method of the present invention.

An initial surface is chosen for each of the unknown surfaces 104 of lens 102. Consider a ray 124A drawn from a central point in the eye towards lens 102 at a spatial viewing angle of θ. The lens designer specifies, for each viewing angle θ, the distance of an object to be viewed by the wearer of the lens. In progressive lenses, for example, viewing angles above the horizon (shown in FIG. 1 as a horizontal dotted line) are generally reserved for far vision, while viewing angles below the horizon are generally reserved for near vision. The following discussion will be specific to some direction of view; it will be appreciated that the same analysis is valid for any direction of view, and, in practice the designer would consider a plurality of directions of view.

When ray 124A reaches lens 102, it is refracted by surfaces 104, whether they are known surfaces or initial guesses for the unknown surfaces. Therefore, the direction of ray 124A on the side of lens 102 away from the eye is generally different than the direction of ray 124A on the side of lens 102 near the eye. Ray 124A is drawn until it reaches a sphere 115A centered at the central point in the eye and whose radius is the prescribed distance for the viewing angle θ. Ray 124A intersects sphere 115A at point 114A. Point 114A defines the basic location of the object to be viewed in the direction θ.

If point object 114A were to emit, say, spherical wavefronts 120A, then they would be refracted by lens 102 into distorted wavefronts 122A. Since lens 102 comprises initial guesses for the unknown surfaces, distorted wavefronts 122A are probably inconsistent with the wearer's prescription. In other words, the initial guesses for the unknown surfaces are probably incorrect. An optimization process is used to determine the optimal surfaces 104 of lens 102, based on a cost function. During the optimization process, the unknown surfaces of lens 102 are varied from the initial surfaces, causing the direction of ray 124A on the side of lens 102 away from the eye to change, as indicated by arrow 126A. As the direction changes, the intersection of ray 124A with sphere 115A, namely point object 114A, changes. It will be appreciated, however, that since, by definition, point object 114A remains on sphere 115A, the lens designer's specification of the distance that the wearer of the lens should be able to see in focus is maintained throughout the optimization process.

The eye has a natural aperture—the eye's pupil 110. As the eye rotates while scanning the viewing field, only a small portion of each of the spherical wavefronts 120A emitted from the point objects actually gets transmitted through the pupil 110. This small portion of each spherical wavefront 120A is converted by lens 102 to a small portion of the corresponding refracted wavefront 122A. These small portions ("localized wavefronts") are centered around ray 124A, which is termed a "chief ray". Each point object 114 is associated with its own chief ray 124 having a viewing angle θ.

Since the shape of refracted wavefront 122A contributes to the image seen by the eye, it characterizes the performance of lens 102 with respect to the point object 114A. Thus the designer wants the refracted wavefronts 122 to have desired properties in order to achieve high quality vision.

PCT publication WO 01/92948 discloses methods for computing the wavefronts as they propagate along the chief ray in each viewing direction, and as they are refracted by the lens. This publication further provides a method for deducing from these wavefronts optical characteristics of the lens such as power, astigmatism and astigmatism distribution.

Applicants discovered that to achieve high quality lenses it is desirable to control further optical properties. In particular applicants discovered that an optimization process that controls optical characteristics of the lens, such as magnification, distortion and torsion, provides superior lenses. An optimization method for controlling a large family of optical properties of a lens will now be described.

Figure 2:
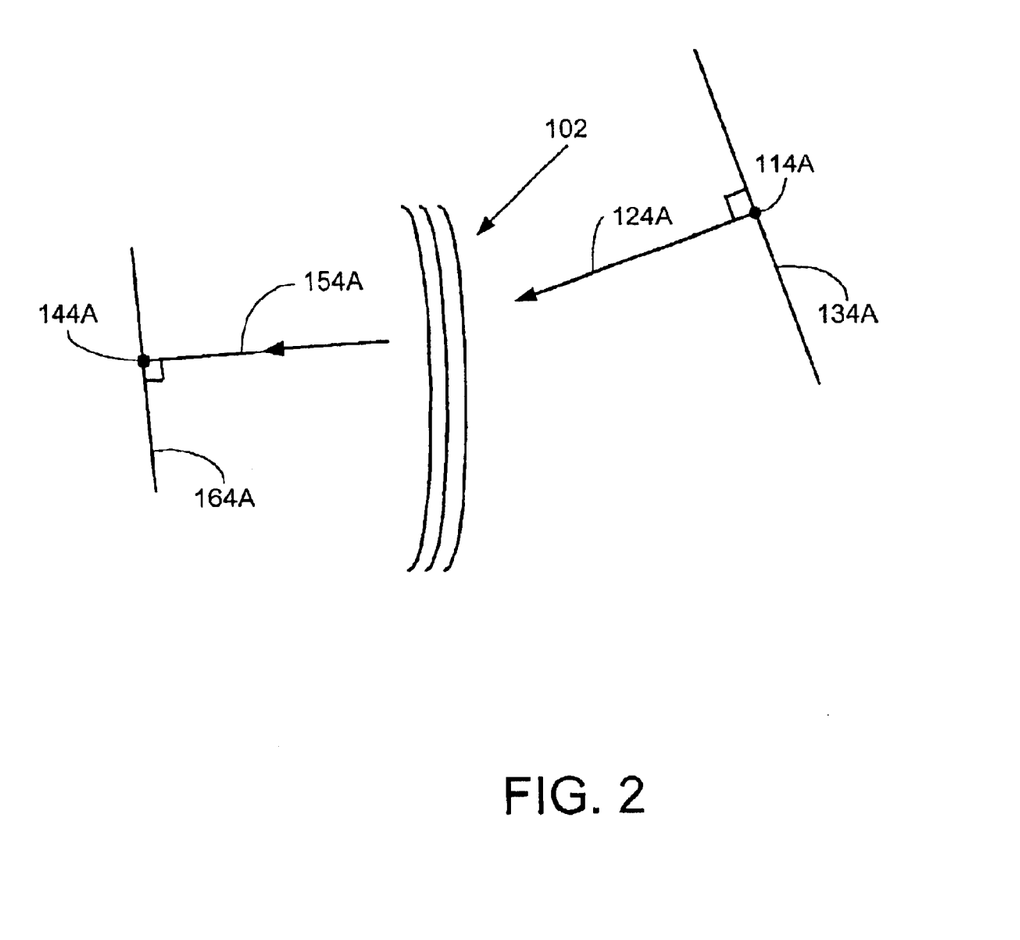
FIG. 2 is a schematic illustration of an object point and an image point, helpful in understanding embodiments of the present invention.

Reference is made now to FIG. 2, which is a schematic illustration of object point 114A, chief ray 124A passing through the object point 114A, a plane 134A passing through the object point that is orthogonal to the chief ray 124A, an image point 144A, which is separated from the object point by lens 102, a chief ray 154A passing through the image point 144A, and a plane 164A passing through the image point 144A that is orthogonal to the chief ray 154A. The chief ray 154A is associated with the chief ray 124A through refraction by lens 102. A coordinate system is defined in each of the planes. The coordinate system in the plane 134A is centered at the point 114A, and the coordinate system in the plane 164A is centered at the point 144A.

The point eikonal function $W(x,y,\tilde{x},\tilde{y})$ is a function of an arbitrary point $(x,y)$ in the object plane 134A and an arbitrary point $(\tilde{x},\tilde{y})$ in the image plane 164A. The point eikonal function provides the optical distance between the point $(x,y)$ and the point $(\tilde{x},\tilde{y})$. Properties of the point eikonal function (that is sometimes called the point characteristic function) are known in the art. For example, this function is defined in R. K. Luneburg, *Mathematical Theory of Optics*, UCLA Press 1964, pp 94–107.

As was explained hereinabove, only the localized behavior of the wavefront near the chief ray is needed to determine the power and astigmatism. Similarly, the point eikonal W needs to be considered only in the vicinity of the origins in the planes 134A and 164A. Mathematically, this amounts to expanding the function W into a Taylor series about the two respective origins. As will be described hereinbelow, many optical properties of interest are contained in the quadratic terms in this Taylor expansion. Moreover, since the chief rays are orthogonal to the planes at the origin, it is known in the art that the Taylor expansion has no linear terms. It is also known in the art that a shift of the point eikonal function by a constant does not affect the imaging properties of the lens. Therefore the leading order terms in the Taylor expansion for W can be expressed in the form given in Equation 1:

$$W = \frac{1}{2}X^T \begin{pmatrix} L & Q \\ Q^T & R \end{pmatrix} X \qquad \text{Equation (1)}$$

where L, Q, and R are 2×2 matrices, X is a vector representing the four variables of W: $X^T=(x,y,\tilde{x},\tilde{y})$, and the superscript T represents the transposing operation; furthermore, the matrices L and R are symmetric.

One of the applications of the point eikonal is to determine the directions of the rays that leave a point $(x,y)$ and arrive at a point $(\tilde{x},\tilde{y})$. If the $(x,y)$ component of such a ray at a point $(x,y)$ on the plane 134A is denoted by a vector $$\begin{pmatrix} \xi \\ \eta \end{pmatrix},$$

and the $(\tilde{x},\tilde{y})$ component of such a ray at a point $(\tilde{x},\tilde{y})$ on the plane 164A is denoted by $$\begin{pmatrix} \tilde{\xi} \\ \tilde{\eta} \end{pmatrix},$$

then the eikonal equations imply the relation given in Equation 2:

$$\begin{pmatrix} -n\xi \\ -n\eta \\ \tilde{n}\tilde{\xi} \\ \tilde{n}\tilde{\eta} \end{pmatrix} = \begin{pmatrix} L & Q \\ Q^T & R \end{pmatrix} X \qquad \text{Equation (2)}$$

where n is the index of refraction at (x,y) and $\tilde{n}$ is the index of refraction at $(\tilde{x},\tilde{y})$ Optical imaging properties of the lens such as astigmatism and power are contained in the matrix R. To see this, consider the special case where x=y=0. In this case, the point eikonal describes (up to an inversion of sign) the shape of the local wavefront after having been deformed by the lens 102. We then obtain the following expression for S:

$$W = R_{11}\tilde{x}^2 + R_{12}\tilde{x}\tilde{y} + R_{22}\tilde{y}^2 \qquad \text{Equation (3)}$$

The entries of the matrix R can be used to define the power and astigmatism of the lens as follows:

$$\text{Power} = \frac{-1}{2\tilde{n}}\{R_{11} + R_{22}\}$$

$$\text{Astigmatism} = \frac{1}{\tilde{n}}\sqrt{[R_{11} - R_{22}]^2 + 4R_{12}^2}.$$

sive Lenses", Computer Graphics Forum, vol. 17, No. 3,

The astigmatism direction associated with the localized wavefront is determined by the angles made by the principal axes of the quadratic form (3) with the coordinate axes.

Figure 3A:
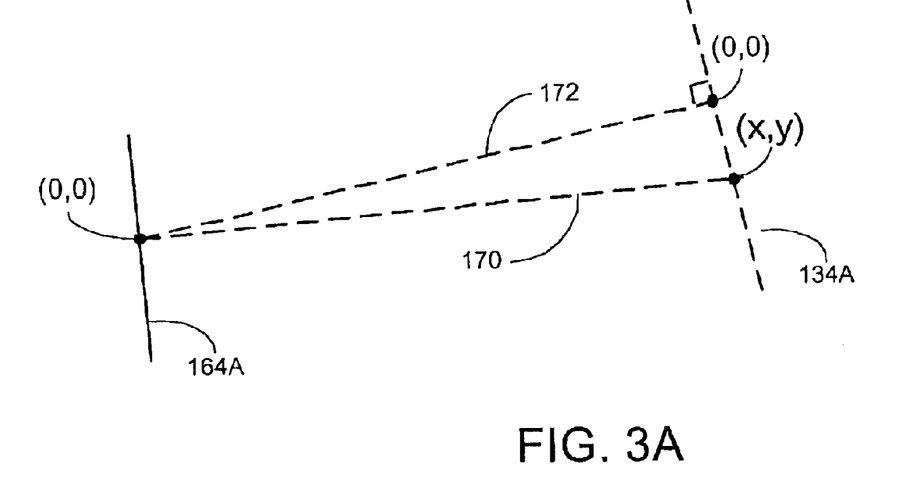
FIG. 3A is a schematic illustration of a plane, a point on the plane, a line connecting the origin of the plane to the origin of another plane and a line connecting the point to the origin of the other plane.
Figure 3B:
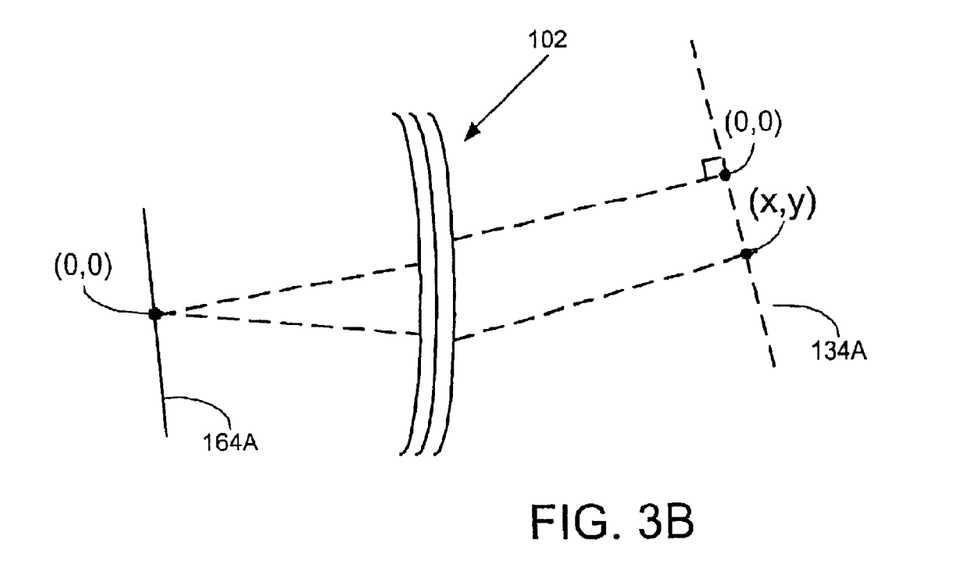
FIG. 3B is a schematic illustration of the elements of FIG. 3A where a lens is present between the two planes.

The matrix Q contains further imaging properties. To understand them we make reference to FIG. 3A which is a schematic illustration of plane 134A, a point (x,y) on that plane, plane 164A, a line 170 connecting the origin of the plane 164A and the point (x,y), and a line 172 connecting the origin of the two planes. FIG. 3A represents the case where there is no lens between the planes 134A and 164A. We select the origin in the plane 164A to be our viewing point. Consider an extended object in the plane 134A, extending from the origin there to some point (x,y) on that plane. If there is no optical element between the plane 164A and the plane 134A (that is, in the absence of the lens 102), the object would be viewed in the direction $$\begin{pmatrix} x/r \\ y/r \end{pmatrix}$$

where r is the length of the line 170. The eikonal equations (Equation 2 above) imply that when lens 102 is present between planes 164A and 134A (as is depicted in FIG. 3B), then the extended object is viewed in the direction given in Equation 4:

$$\begin{pmatrix} \tilde{\xi} \\ \tilde{\eta} \end{pmatrix} = \frac{1}{\tilde{n}} Q^T \begin{pmatrix} x \\ y \end{pmatrix}. \qquad \text{Equation (4)}$$

Multiplying and dividing the last equation by r, we obtain the following relation:

$$\begin{pmatrix} \tilde{\xi} \\ \tilde{\eta} \end{pmatrix} = \frac{r}{\tilde{n}} Q^T \begin{pmatrix} x/r \\ y/r \end{pmatrix}. \qquad \text{Equation (5)}$$

It follows that the matrix $$\frac{r}{\tilde{n}} Q^T$$

provides the information on the angular magnification, distortion and torsion of an extended object as viewed through the lens 102 in the general viewing direction θ.

In an embodiment of the present invention, the matrix Q is written as a product of two matrices Q=VY, where the matrix V is a rotation matrix, parameterized by a rotation angle γ;

$$V = \begin{pmatrix} \cos\gamma & -\sin\gamma \\ \sin\gamma & \cos\gamma \end{pmatrix}$$

and the matrix Y is a symmetric matrix. The eigenvalues of the matrix Y are denoted by $\mu_1$ and $\mu_2$. The eigenvectors of Y determine the magnification axes. It is then possible to define several optical properties associated with the lens 102:

$$\text{Magnification} = \frac{r}{2\tilde{n}}\{\mu_1 + \mu_2\}$$

$$\text{Distortion} = \frac{r}{\tilde{n}}\{\mu_1 - \mu_2\}$$

Distortion angle: The angle ϕ between the largest magnification axis (i.e. the direction of the eigenvector associated with the largest eigenvalue) and the x axis.

Torsion: The angle γ that parameterizes the rotation matrix V.

It will be appreciated that the different optical characteristics may be computed at different planes along the chief ray. Once an eikonal is known with respect to two planes in the object and image spaces, it is known in the art how to find the eikonal along shifted planes when the shift(s) are along the chief rays. For example, the power and the astigmatism are preferably evaluated by the formula described hereinabove on the vertex sphere (shown in FIG. 1 as a virtual sphere 118 of a fixed radius known in the industry centered at the center of the eye and having its vertex coinciding with the vertex of the back surface of lens 102) as is described in PCT publication WO 01/92948. The magnification parameters are preferably evaluated on a plane orthogonal to the chief ray that passes through the center of rotation of the eye.

Figure 4:
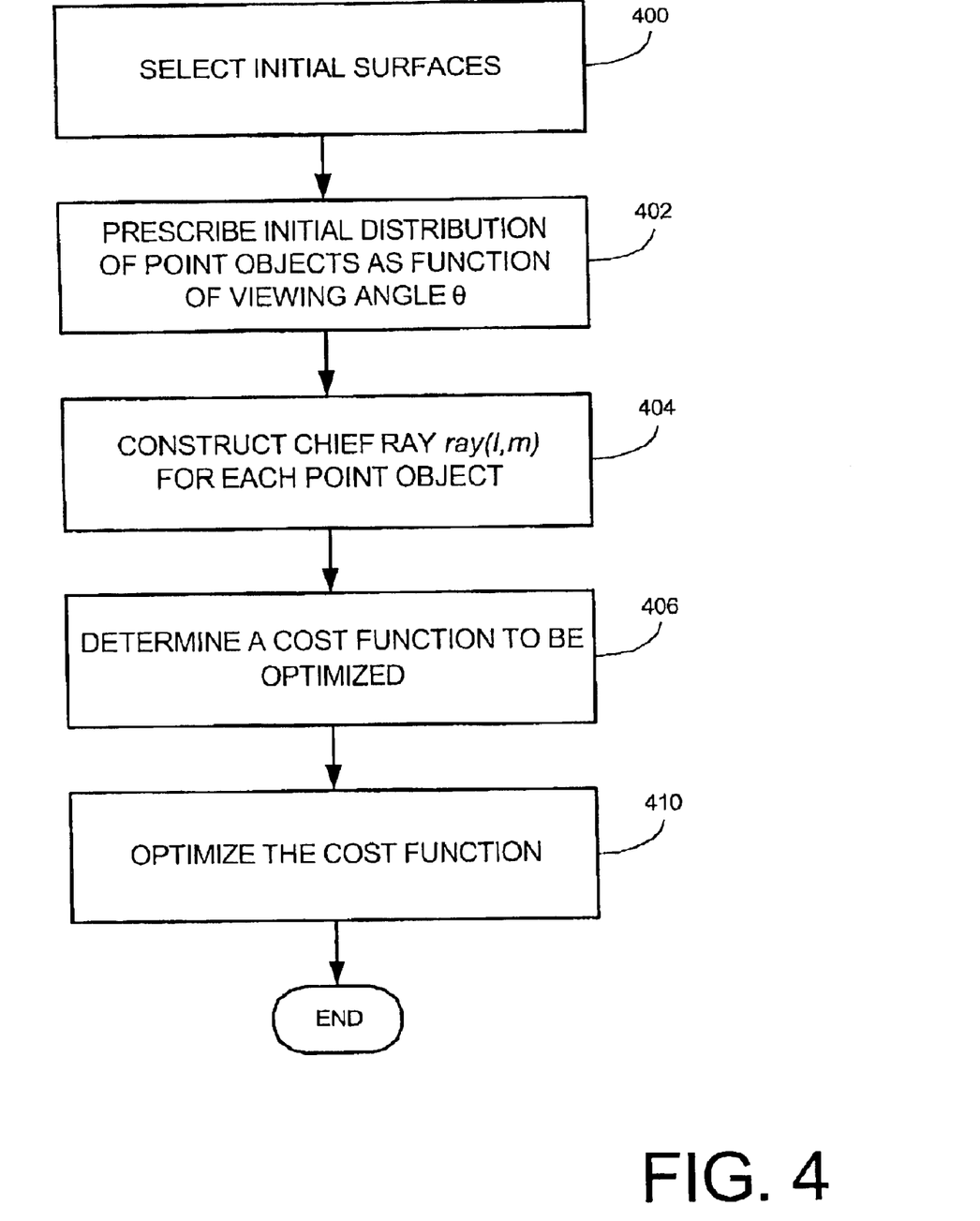
FIG. 4 is a flowchart illustration of a method for designing optical elements using eikonal functions, according to an embodiment of the present invention.

Reference is also made to FIG. 4, which is a flowchart illustration of a method for designing optical elements using eikonal functions, according to an embodiment of the present invention.

Initial surfaces are chosen for the unknown surfaces of the optical element (step 400). These initial surfaces are typically represented in one of the representations described hereinabove.

The designer of the lens then prescribes an initial distribution of point objects, which is a function of the angle θ (step 402).

A chief ray is constructed, as explained hereinabove with respect to FIG. 1, for each of the point objects (step 404).

The optimization process of the present invention requires repeated calculations of the intersection points of the chief rays with the surfaces of the optical element. When the surfaces are described discretely in a fixed global coordinate system, for example Cartesian coordinates or polar coordinates, this calculation is computationally intensive. Therefore, an alternative "ray representation", in which the surfaces are represented by their distance from predetermined fixed points along the chief rays, is preferred. Such a ray representation is disclosed in PCT publication WO 01/92948. A chief ray ray(l,m) is parameterized by coordinates (l,m), which correspond to the viewing angle that is associated with the chief ray. As explained in PCT publication WO 01/92948, the coordinates (l,m) provide a convenient parameterization of the surfaces that are to be optimized and of the functions that appear in the cost function as will be explained hereinbelow.

Since the localized point eikonals associated with different object points are of finite extent, it is expected that they will overlap somewhat. A given area on the lens may be related to different point eikonals associated with different viewing directions. Therefore it may happen that some lens shapes are advantageous for viewing some objects but not for viewing other objects. The optimization process compromises between the requirements of good lens performance for all the point objects. In order to compute a lens providing high quality vision, the designer determines a cost function to be optimized (step 406 of FIG. 4).

In an embodiment of the present invention, the cost function G is written in the form given in Equation 6:

$$G = \sum_{l,m \in D} \sum_{i=1}^{M} U_i(l, m, S, w) \qquad \text{Equation (6)}$$

where (l,m) are the parameters used to describe points on the lens surfaces, D is the domain in which l and m are defined, $w_i$ are the weight functions used by the designer to emphasize different factors in the cost functions, S stands for the collection of lens surfaces $S_1, S_2, \ldots, S_k$, and the sum is over the M various factors $U_i$. The weight functions $w_i$ can depend on the parameters l and m and on the surfaces S and their gradients. In an embodiment, some of the factors $U_i$ are chosen to be linear functions of the weights, in the form:

$$U_i(l,m,S,w) = w_i(l,m,S)T_i(l,m,S),$$

where $T_i$ are the factors in the cost function.

The designer selects the factors $U_i$ and/or $T_i$ for optimization. In an embodiment, the factors $U_i$ and/or $T_i$ comprise any combination of the following terms:

Power Terms

PCT publication WO 01/92948 discloses a method by which the designer selects a predetermined function $P_V(l,m)$ that prescribes the desired power of the lens at the point (l,m). Then the designer sets a term that is related to the deviation of the actual power $P(l,m)$ from the desired power $P_V(l,m)$. In an embodiment a combination of terms of the form $|P(l,m) - P_V(l,m)|^\beta$ for several choices of $\beta$ is used to control the power of the lens. In particular, $\beta$ may have values other than 2.

Astigmatism Terms

PCT publication WO 01/92948 discloses a method by which the designer selects a predetermined function $C_V(l,m)$ that prescribes the desired astigmatism of the lens at the point (l,m). PCT publication WO 01/92948 discloses a method by which a weighted combination of terms of the form $|C(l,m) - C_V(l,m)|^\beta$ is used for several choices of $\beta$ is used. In particular, $\beta$ can have values other than 2. Applicants have discovered that superior designs can be achieved if the predetermined distribution of power and astigmatism are such that they cannot be attained jointly by an actual lens, and such that they do not necessarily match the wearer's prescription. The advantage of using such predetermined distributions is that they provide the optimization process with larger flexibility than when restricting the designs to predetermined power and astigmatism that correspond jointly to actual lenses.

Astigmatism Direction Terms

PCT publication WO 01/92948 discloses a method for controlling the astigmatism direction in which the designer predetermines an astigmatism direction distribution, and the cost function has a term that minimizes the deviation of the actual astigmatism direction from the predetermined astigmatism direction distribution.

Magnification Parameters Terms

The designer predetermines a function $M_V(l,m)$ that prescribes the desired magnification of the lens at the point (l,m), and a function $B_V(l,m)$ that prescribes the desired distortion of the lens at the point (l,m). Then the designer sets one or more terms that are related to the deviation of the actual magnification $M(l,m)$ from the desired magnification $M_V(l,m)$ and a term that is related to the deviation of the actual distortion $B(l,m)$ from the desired distortion lens.

The designer can control the distortion angle by a method that is similar to the method that was disclosed in PCT publication WO 01/92948 for controlling the astigmatism direction. For this purpose the designer predetermines a distortion direction distribution. When viewing an object in a direction (l,m), the original (x,y) coordinate system in the plane 164A of FIG. 2 is rotated so that the rotated coordinate system has the same axes as in the predetermined distortion direction distribution (there is one such direction and one such plane in each viewing direction). Since the optimal form of the symmetric matrix Y (i.e. one that matches the predetermined distortion direction distribution) would be diagonal, the mixed term in the quadratic form that is defined by the symmetric matrix Y, that is the entry $Y_{12}$ in this matrix, represents the deviation of the distortion direction induced by the lens and the predetermined distortion direction. The cost function includes a weighted combination of such mixed terms of the symmetric matrix and thus the distortion direction is controlled.

The designer can control the torsion induced by the lens by predetermining a distribution of rotation angles $\gamma_v$ and associated rotation matrices $V_v$. The designer thus obtains a set of predetermined rotation matrices $V_V(l,m)$ that prescribes the desired torsion of the lens at the point (l,m). Then the designer sets a term that is related to the deviation of the actual torsion $V(l,m)$ from the desired torsion $V_V(l,m)$.

Cosmetic Terms

One of the criteria for the quality of a lens is its overall appearance, and in particular its thickness. Since the optimization methods of the present invention take the full structure of the lens into account, together with its constituent surfaces, PCT publication WO 01/92948 discloses a method in which a term that is proportional to the lens thickness at the point is added to the cost function.

Prism Terms

PCT publication WO 01/92948 discloses a method for controlling the prism in which the designer predetermines a prism distribution, and the cost function has a term that minimizes the deviation of the actual prism from the predetermined prism distribution.

Gradient of the Optical Characteristics Terms

Applicants have realized that the lens performance can be improved by preventing too rapid variations in the lens characteristics. Alternatively, the designer may wish to obtain a prescribed distribution of the variations. For every lens characteristic, denoted by CH, the designer adds a weighted combination of terms of the form $|\nabla CH(l,m) - \nabla CH_V(l,m)|^\beta$, where $\nabla$ is the gradient operator, and $\nabla CH_V(l,m)$ is the desired gradient distribution of CH. In some embodiments of the present invention, the lens characteristics for which variations are controlled during optimization may include power, astigmatism, prism, astigmatism direction, magnification, distortion, torsion and distortion direction.

Dependence of the Optical Characteristics on the Objects

Applicants have discovered that it is also important to control the variations of the optical characteristics of a lens as a function of a change in the distance of the object that is viewed in a given direction. Such variations can be controlled by adding to the cost function a weighted combination of terms that involve the derivative of the optical characteristics with respect to the object distance.

The cost function defined hereinabove requires the specification of weight functions and a number of predetermined functions. U.S. Pat. No. 6,302,540 to Katzman et al. discloses a method in which the designer examines the overall optical performance of the lens, and, if necessary, adjusts parameters, including weight functions and predetermined functions to improve the design. Applicants have discovered that in order to accelerate the design process, and in particular in order to obtain customized designs, it is preferred to have an automatic system to select the weight functions and the predetermined functions.

In one embodiment the designer prepares a database consisting of a set of candidate functions for each of the weight functions and/or the predetermined functions that are to be used in the optimization process. Furthermore, the designer prepares a rule that associates a specific design requirement with a specific choice of the weight functions and the predetermined functions from the database. The association depends on one or more parameters. In an embodiment, the association depends on the prescription of the wearer. In another embodiment, a person skilled in the art finds the association function after having designed many lenses by known methods, such as the method disclosed in U.S. Pat. No. 6,302,540.

In another embodiment an expert system is employed in selecting the weight functions and/or the predetermined functions that are used in the optimization. An example of such an expert system will now be described. In this example we demonstrate a method for selecting a weight function for a power-related term in the cost function as described hereinabove. A database $D_b$ of candidate cost functions (elements of the database $D_b$) is prepared. An expert system is then trained to select the weight functions for the optimization process. The selection criteria may include, but are not limited to, factors such as the lens prescription, the specifics of the design code, the wearer's characteristics such as the inter-pupil distance, the prism needed for the lens, the frame shape, etc.

An expert system is a computer program that can evaluate the performance of a given system, and, if necessary, change the system's behavior to enhance its performance. An example of such an expert system is an algorithm known as Multi-Layer Perceptron (MLP). The MLP method that is described in detail in B. D. Ripley, *Pattern Recognition and Neural Networks*, Cambridge University Press, 1996, pp. 143–155, consists of an array of input parameters $(T_i)$, i=1, 2, ..., $K_1$, an array of output parameters $(O_j)$, j=1,2, ..., $K_2$ and one more layer of network weights $(N_{ij})$ connecting the array $(T_i)$ and the array $(O_j)$. The value of an entry $O_j$ of the output array $(O_j)$ is determined by a function of the entries of the input array $(T_i)$ and the networks weights $(N_{ij})$.

In the case of finding the weight function to be used in the cost function hereinabove, the input parameters are selected from a list that includes the prescription of the lens, the specifics of the design code, the wearer's characteristics such as the inter-pupil distance, the prism needed for the lens, the frame shape, etc. Each entry in the output array is associated with a candidate function from the database $D_b$. It would be appreciated that once the network weights $(N_{ij})$ have been determined by training the system, these network weights determine the MLP. When the MLP is then fed with input parameters for a specific design, the MLP determined the values of the output parameters. Typically one entry in the output array $(O_j)$ will have the largest value, and then the weight function in the database $D_b$ that is associated with this entry is selected for the cost function in the optimization process as described hereinabove.

In an embodiment new weight functions for the optimization process are created out of the fixed database $D_b$. The new weight function is created as a combination of the weight functions from the database where the coefficients of the combination are determined by an a priori set of rules or by the output of an expert system as described hereinabove.

Once the cost function has been chosen, it needs to be optimized (step 410 of FIG. 4). The optimization process consists of searching for those surfaces that yield the best value for the cost function. The cost function is optimized subject to the requirement that the surfaces never intersect and possibly subject to additional constraints given in the form of prescribed values for the surfaces and/or their derivatives at a selected set of points. The result of the optimization process is a numerical representation of all designed surfaces of the optical element.

Many optimization methods are known in the art. For example, common techniques include the conjugate gradient method and the Newton method. Any of these methods or other method known in the art can be used in the present invention.

The optimization process requires the computation of point eikonal functions. PCT publication WO 01/92948 discloses a method for computing a family of eikonal funations E. The family of eikonal functions E is described in Equation (4) of PCT publication WO 01/92948. The family E is valid for the initial lens and for all lenses that are similar to it. The point eikonal function as described hereinabove can be computed from the family E by confining the variables of E to the planes 134 and 164 as described hereinabove. If during the optimization process the current lens deviates appreciably from the initial lens, the family E is recomputed with respect to the current lens as is described in PCT publication WO 01/92948. The new family thus computed is valid for the current lens and for lenses that are similar to it.

It would be appreciated that this method provides an efficient method for computing the point eikonal function with respect to every chief ray, as it does not require computing a large number of ray tracing for each iteration in the optimization step, as is explained in PCT publication WO 01/92948. Alternatively, other methods for computing the point eikonal function are known in the art, and any one of them can be used to compute $W(x,y,\tilde{x},\tilde{y})$. It would be appreciated that there are other eikonal functions known in the art, as described for example in R. K. Luneburg, *Mathematical Theory of Optics*, UCLA Press 1964, and any one of them can be used instead of $W(x,y,\tilde{x},\tilde{y})$ for the purpose of computing the optical terms that appear in the cost function.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for designing one or more surfaces of an ophthalmic lens, the method comprising:
   representing said surfaces with parameters;
   choosing a function in said parameters, said function including a term involving the power induced by said ophthalmic lens and a predetermined power distribution, a term involving the astigmatism induced by said ophthalmic lens and a predetermined astigmatism distribution, and one or more of the following terms:
   a term involving the magnification induced by said ophthalmic lens,
   a term involving the distortion induced by said ophthalmic lens,
   a term involving the distortion direction induced by said ophthalmic lens,
   a term involving the torsion induced by said ophthalmic lens, and
   a term involving the astigmatism direction induced by said ophthalmic lens; and
   optimizing said function with respect to said parameters.

2. The method of claim 1, including a term involving the magnification induced by said ophthalmic lens, wherein said term involving the magnification induced by said ophthalmic lens also involves a predetermined magnification distribution.

3. The method of claim 1, including a term involving the distortion induced by said ophthalmic lens, wherein said term involving the distortion induced by said ophthalmic lens also involves a predetermined distortion distribution.

4. The method of claim 1, including a term involving the distortion direction induced by said ophthalmic lens, wherein said term involving the distortion direction induced by said ophthalmic lens also involves a predetermined distortion direction distribution.

5. The method of claim 1, including a term involving the torsion induced by said ophthalmic lens, wherein said term involving the torsion induced by said ophthalmic lens also involves a predetermined torsion distribution.

6. The method of claim 1, including a term involving the astigmatism direction induced by said ophthalmic lens, wherein said term involving the astigmatism direction induced by said ophthalmic lens also involves a predetermined astigmatism direction distribution.

7. The method of claim 1, wherein said function includes a term related to the thickness of said ophthalmic lens.

8. The method of claim 1, wherein said function involves one or more weight distributions and the method further comprises:
   determining said weight distributions from a database of weight functions using a predetermined rule.

9. The method of claim 1, wherein said function involves one or more weight distributions and the method further comprises:
   determining said weight distributions from a database of weight functions using an expert system.

10. The method of claim 9, wherein said expert system uses a neural network algorithm.

11. A method for designing one or more surfaces of an ophthalmic lens, the method comprising:
    representing said surfaces with parameters;
    choosing a function in said parameters, said function involving one or more weight distributions and including a term involving the power induced by said ophthalmic lens and a predetermined power distribution and a term involving the astigmatism induced by said ophthalmic lens and a predetermined astigmatism distribution;
    determining said weight distributions from a database of weight functions using a predetermined rule; and
    optimizing said function with respect to said parameters.

12. A method for designing one or more surfaces of an ophthalmic lens, the method comprising:
    representing said surfaces with parameters;
    choosing a function in said parameters, said function involving one or more weight distributions and including a term involving the power induced by said ophthalmic lens and a predetermined power distribution and a term involving the astigmatism induced by said ophthalmic lens and a predetermined astigmatism distribution;
    determining said weight distributions from a database of weight functions using an expert system; and
    optimizing said function with respect to said parameters.

13. The method of claim 12, wherein said expert system uses a neural network algorithm.

14. A method for designing one or more surfaces of an ophthalmic lens, the method comprising:
    receiving a prescription of a specific wearer for said ophthalmic lens;
    representing said surfaces with parameters;
    choosing a function in said parameters, said function including a term involving the difference between the astigmatism induced by said ophthalmic lens and a predetermined astigmatism distribution related to said prescription, said predetermined astigmatism distribution describing different astigmatism than that required by said prescription, and a term involving the difference between the power induced by said ophthalmic lens and a predetermined power distribution, without said predetermined astigmatism distribution and said predetermined power distribution representing jointly the astigmatism and power of a physically attainable lens; and
    optimizing said function with respect to said parameters.

15. A method for designing one or more surfaces of an ophthalmic lens, the method comprising:
    representing said surfaces with parameters;

choosing a function in said parameters, said function including a term involving the difference between the astigmatism induced by said ophthalmic lens and a predetermined astigmatism distribution, and a term involving the difference between the power induced by said ophthalmic lens and a predetermined power distribution, without said predetermined astigmatism distribution and said predetermined power distribution representing jointly the astigmatism and power of a physically attainable lens; and optimizing said function with respect to said parameters.

* * * * *